(12) United States Patent
Kuznetsov et al.

(10) Patent No.: US 10,594,728 B2
(45) Date of Patent: Mar. 17, 2020

(54) DETECTION OF DOMAIN NAME SYSTEM HIJACKING

(71) Applicant: Avast Software s.r.o., Prague (CZ)

(72) Inventors: Dmitriy Kuznetsov, Prague Smichov (CZ); Martin Smarda, Karlovy Vary (CZ); Pavel Sramek, Pribram (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 172 days.

(21) Appl. No.: 15/638,160

(22) Filed: Jun. 29, 2017

(65) Prior Publication Data

US 2018/0007088 A1  Jan. 4, 2018

Related U.S. Application Data

(60) Provisional application No. 62/356,186, filed on Jun. 29, 2016.

(51) Int. Cl.
| | | |
|---|---|---|
| *G06F 21/57* | (2013.01) | |
| *H04L 29/06* | (2006.01) | |
| *G06F 21/55* | (2013.01) | |
| *H04L 29/12* | (2006.01) | |

(52) U.S. Cl.
CPC .......... *H04L 63/1483* (2013.01); *G06F 21/55* (2013.01); *G06F 21/554* (2013.01); *G06F 21/577* (2013.01); *H04L 61/1511* (2013.01); *H04L 63/101* (2013.01); *H04L 63/1441* (2013.01)

(58) Field of Classification Search
CPC ............. H04L 63/1483; H04L 61/1511; H04L 63/1441; H04L 63/1425
See application file for complete search history.

(56) References Cited

U.S. PATENT DOCUMENTS 8,387,145 B2 * 2/2013 Xie ........................ H04L 63/101
726/24
10,389,680 B2 * 8/2019 Manadhata ............. H04L 63/02
(Continued)

FOREIGN PATENT DOCUMENTS

CN          102868773 B  *  4/2015

OTHER PUBLICATIONS

How do you avoid/detect DNS hijacking? (aka latest twitter hack), https://serverfault.com/questions/95735/how-do-you-avoid-detect-dns-hijacking-aka-latest-twitter-hack, 1 page. Accessed Sep. 25, 2017.

(Continued)

*Primary Examiner* — Michael Simitoski
*Assistant Examiner* — Tarek Elarabi
(74) *Attorney, Agent, or Firm* — Husch Blackwell LLP

(57) ABSTRACT

Detecting a Domain Name Service (DNS) hijacking includes resolving names in a hijack target group list to their respective Internet Protocol (IP) addresses. In response to determining that two names in the hijack target group list resolved to a common IP address, a determination is made whether a legitimate reason exists for the two names in the hijack target group list to resolve to the common IP address. In response to determining that a legitimate reason does not exist for the two names in the hijack target group list to resolve to a common IP address, a DNS hijacking is indicated.

20 Claims, 3 Drawing Sheets

(56) References Cited

U.S. PATENT DOCUMENTS

| | | | |
|---|---|---|---|
| 2010/0313264 A1* | 12/2010 | Xie | H04L 63/101 |
| | | | 726/22 |
| 2013/0014253 A1 | 1/2013 | Neou et al. | |
| 2013/0318170 A1 | 11/2013 | Crume | |
| 2016/0150004 A1* | 5/2016 | Hentunen | H04L 67/1036 |
| | | | 726/23 |
| 2016/0226819 A1* | 8/2016 | Manadhata | H04L 61/1511 |

OTHER PUBLICATIONS

DNS Hijacking: Exposed & Explained, the VPN Guru, https://thevpn.guru/dns-hijacking-exposed-explained/, 17 pages. Accessed Nov. 2, 2017.

* cited by examiner

DETECTION OF DOMAIN NAME SYSTEM HIJACKING

CROSS-REFERENCE TO RELATED APPLICATIONS

This Application claims priority to U.S. Provisional Patent Application Ser. No. 62/356,186, filed on Jun. 29, 2016, entitled "Detection of Domain Name System Hijacking," the entire disclosure of which is incorporated herein by reference.

FIELD OF INVENTION

The present invention relates generally to computing systems, and more particularly, to detecting hijacking of a domain name system.

BACKGROUND OF INVENTION

The Internet Protocol (IP) is the dominant network protocol used on the Internet. Two version of IP are currently in use, IPv4 (IP version 4) and its successor, IPv6 (IP version 6). Computing systems that use IP to communicate are assigned an IP address. An IPv4 address is a 32 bit value that is unique within the network. It is common to represent IPv4 addresses in a dotted notation having four 8 bit components. For example, an IPv4 address may be 192.168.0.1. An IPv6 address is a 128 bit integer that is unique within a network. IPv6 addresses are typically represented as eight groups of four hexadecimal digits with the groups being separated by colons, for example 2001:0db8:0000:0042:0000:8a2e:0370:7334. Clearly, such numeric addresses are hard for users to remember. Therefore, IP addresses can be mapped to more easily remembered names. For example, the IP address 46.4.67.14 may be associated with "avast.com." The Doman Name System (DNS) is a decentralized system in which domain names are translated to their associated Internet Protocol address. Each domain has an authoritative name server that publishes information about the domain and lower level name servers in the domain.

"DNS hijacking" (also referred to as "DNS redirecting") is a common form of cyber-attack targeting the networks of end users. It is often combined with phishing or identity theft and is relatively easy to perform. In a DNS hijack scenario, an attacker modifies the DNS server settings of a computer or a router such that DNS queries made by the affected computer (or devices in the affected network) are sent to a DNS server under the attacker's control instead of a legitimate DNS server. Having this control, the attacker chooses one or more domain names that are to be hijacked, and configures the attacking DNS server to return an IP address of the attacker's choice (typically a malicious one, presumably containing a phishing site or another cyber attack) when queried for the chosen domain name(s). Thus, a victim using a web browser to navigate to www.examplebank.com will not contact the server belonging to Example Bank Corp., but a server entirely controlled by the attacker.

SUMMARY OF THE INVENTION

The present invention generally relates to a system and method for detecting a Domain Name Service (DNS) hijacking. One embodiment of the present invention provides a method including a step for resolving the domain names in a hijack target group (HTG) list to corresponding Internet Protocol (IP) addresses. A network security scanner can send a DNS request and receive DNS records in response to the request to access the DNS resolving. The resolved IP addresses can be checked against a blacklist, such as a malicious IP database. Once an identifying a blacklist check is performed, the results are reviewed to determine whether the resolved IP address is on the blacklist. If the IP address is on the blacklist, a DNS hijacking is reported.

In one embodiment, the method includes the step of determining whether any two of the domain names in a hijack target group list were resolved to a common IP address. The method may further include the step of resolving domain names in a control group list to IP addresses. Then, the method may determine, based on the resolving of domain names in the control group list, whether a domain name in the control group list resolved to the same IP address as any other domain name in either the hijack target group list or the control group list. In another step, it may be determined whether a legitimate reason exists for the two domain names in the hijack target group list to resolve to the common IP address. This may include, for example, that the two domain names resolving to the common IP address belong to a same subgroup. In response to determining that a legitimate reason does not exist for the two domain names in the hijack target group list to resolve to the common IP address, an indication, warning or report can be made that a DNS hijacking has occurred.

Another embodiment of the present invention is directed to a non-transitory computer readable storage medium having a program stored thereon suitable for performing a method for detecting a DNS hijacking. The method can allow a computing device to issue queries for IP addresses associated with domain names. The computing device can be coupled with a network security scanner having first and second domain name group lists. The first and second domain name group lists may comprise a hijack target group list and a control group list. A determination can be made, based on the resolving of domain names in a first domain name group list, whether two domain names in the first domain name group list resolved to a common IP address. Then, it may be determined whether a legitimate reason exists for the two domain names in the first domain name group list to resolve to the common IP address. This may include determining if the two such domain names belong to a same subgroup. In response to determining that a legitimate reason does not exist for the two domain names to resolve to the common IP address, an indication, warning or report can be made that a DNS hijacking has occurred.

Other and further objects of the invention, together with the features of novelty appurtenant thereto, will appear in the course of the following description.

BRIEF DESCRIPTION OF THE DRAWINGS

For a better understanding of the disclosure, reference may be made to the accompanying drawings in which.

DETAILED DESCRIPTION OF INVENTION

Figure 1:
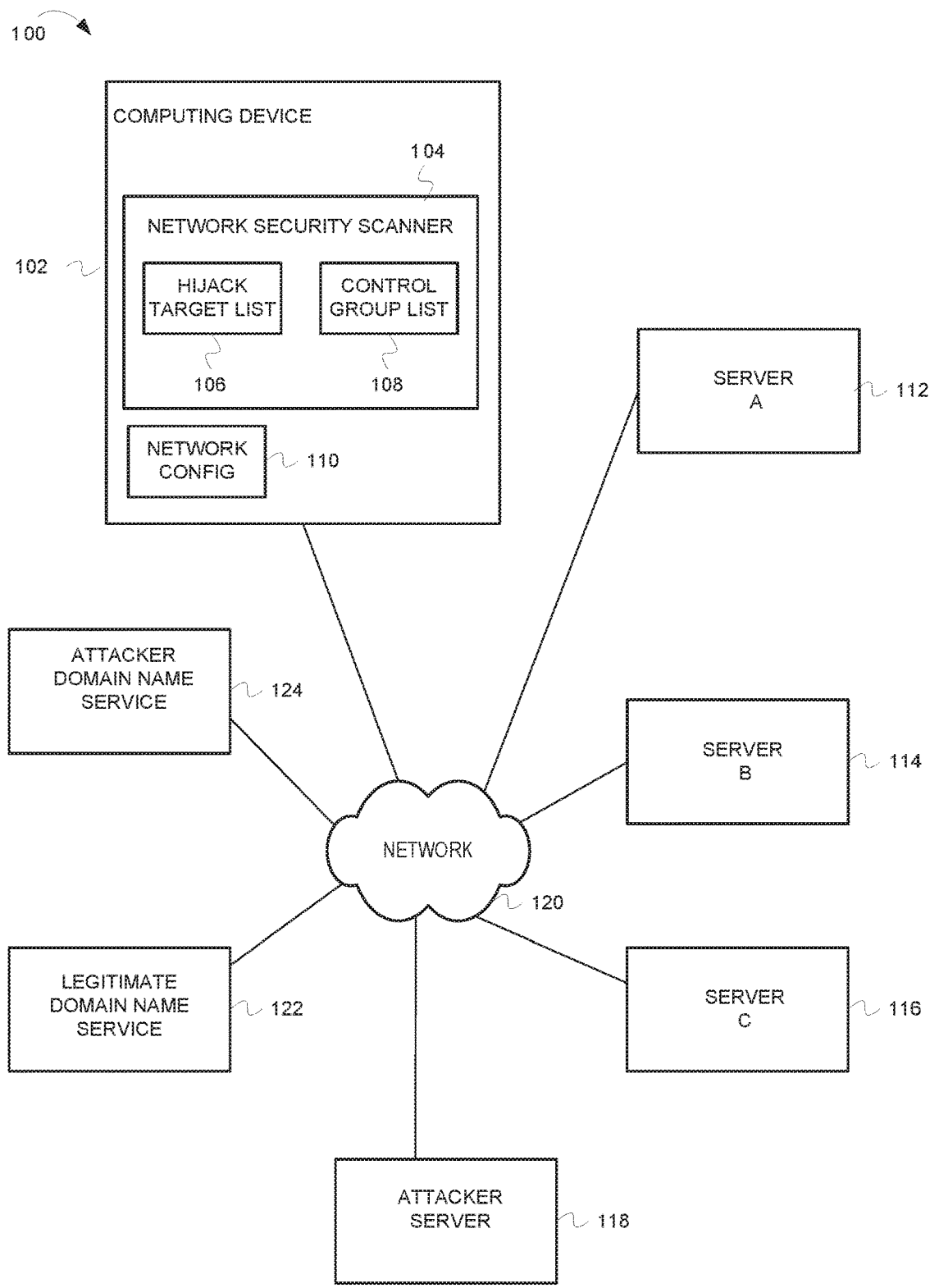
FIG. 1 is a block diagram illustrating a system for detecting DNS hijacking in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the figures, the same reference number is used throughout to refer to an identical component that appears in multiple figures. Signals and connections may be referred to by the same reference number or label, and the actual meaning will be clear from its use in the context of the description. In general, the first digit(s) of the reference number for a given item or part of the invention should correspond to the figure number in which the item or part is first identified.

The descriptions of the various embodiments are to be construed as examples only and do not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating a system environment 100 for detecting DNS hijacking. In some aspects, system 100 includes a computing device 102, one or more servers (e.g., server A 112, server B 114, and server C 116), attacker server 118, a legitimate domain name service 122, and an attacker domain name service 124, all coupled via network 120. Network 120 can be any type and combination of wired and wireless network. In some aspects, network 120 can be an internet.

The computing device 102 can be any type of device with one or more processors to execute software programs. Examples of such devices include a desktop computer, server computer, laptop computer, tablet computer, mainframe computer, smart phone, personal digital assistant, set top box, or any other computing device capable of executing the methods described herein.

As with the computing device 102, server A 112, server B 114, and server C 116 can also be any type of device with one or more processors, and can include desktop computers, server computers, laptop computers, tablet computers, mainframe computers, smart phones, personal digital assistants, and set top boxes.

A attacker server 118 is a computing device that is configured to deliver malware to a victim computing device, engage in "phishing" activity, or perform some other type of cyber attack on a victim computing device.

A legitimate domain name service 122 provides domain name services to client systems such as computing device 102. For example, the computing device 102 may issue a query for an IP address associated with a domain name. The legitimate domain name service 122 receives the query and provides the legitimate (i.e., true) IP address associated with the domain name in response to the query.

An attacker domain name service 124 is also configured to provide domain name services to the client system. However, the attacker domain name service 124 does not necessarily provide the true IP address for a domain name Instead, the attacker domain name service 124 may provide the IP address for the attacker server 118 in response to a query. This causes the querying system to receive a false IP address. When the victim computing device uses the false IP address to communicate with what it believes to be a legitimate server, the attacker server 118 may engage in cyber-attack activities such as phishing, malware delivery or other types of malware attacks.

In order to hijack a legitimate DNS service (e.g., DNS service 122), an attacker modifies the DNS server settings in the network configuration 110 of a computing device 102, or a router such that DNS queries made by the affected computer (or devices in the affected network) are redirected to the attacker DNS server 124 under the attacker's control instead of a legitimate DNS service (e.g., DNS service 122). Having this control, the attacker chooses one or more domain names, that the attacker wishes to hijack the traffic for, and instructs the attacker DNS service 124 to return an IP address of their choice (a malicious one, presumably containing a phishing site or another cyber-attack) when queried for the chosen domain name(s). For example, assume that a user on the computing device 102 uses a web browser to navigate to the server A 112 having a URL of "www.examplebank.com." The attacker DNS service 124 may return a false IP address for attacker server 118 such that the browser will not contact the server A 112 belonging to Example Bank Corp., but instead contacts attacker server 118 that is entirely controlled by the attacker.

The computing device 102 can include a network security scanner 104 that can be configured to perform the methods disclosed herein to detect DNS hijacking. In some aspects, the network security scanner 104 uses a hijack targets list 106 and a control group (CG) list 108 to determine whether a DNS hijacking has occurred on the computing device 102.

The hijack targets list 106 can include fairly common domain names which are likely to be targets of a DNS hijack attack, i.e., redirecting the target's traffic to an attack server for potential use to in cyber-attacks or other nefarious profit generation by the attacker. The domain names in the hijack targets list 106 are usually, but not exclusively, domain names of banks (for frauds), social networks (for identity thefts), eshops (for frauds), traffic monitoring services (for executing malicious payloads on lots of websites that use code loaded from these services) and security product vendors (for denying access to tools that mitigate the attack). In some aspects, the hijack targets list 106 can be manually constructed by a malware analyst, based on past experience and current threats. It can be later updated as required. As an example, the current hijack targets list 106 can be provided with a computer security tool such as an anti-malware software package. Later updates can be pushed to the computing device 102 or pulled on demand.

Note that any pair of domains in the hijack targets list 106 might be owned by the same company. For example, a big corporation might own a video hosting and a mail service, and both of them have two completely independent domain names. It can result to a legitimate situation when those domain names are resolved to the same IP address, because different web applications of the same owner might share physical infrastructure (servers). In some aspect, in order to avoid false positives in testing for DNS hijacks, domain names in the hijack targets list 106 that belong to one owner can be assigned to a dedicated subgroup. Identification of the owners can be collected manually or automatically using WHOIS databases, for example.

The control group list 108 can contain highly prevalent domain names which are unlikely to be ever hijacked, i.e., hijacking them is not likely to bring any profit to the attacker. These are usually, but not exclusively, domain names of non-profit internet services, universities, open-source projects and consumer product vendors. In some aspects, the control group list 108 can be manually created and later updated as required.

Further details on the operation of a network security scanner 104 are provided below with respect to FIG. 2.

Figure 2:
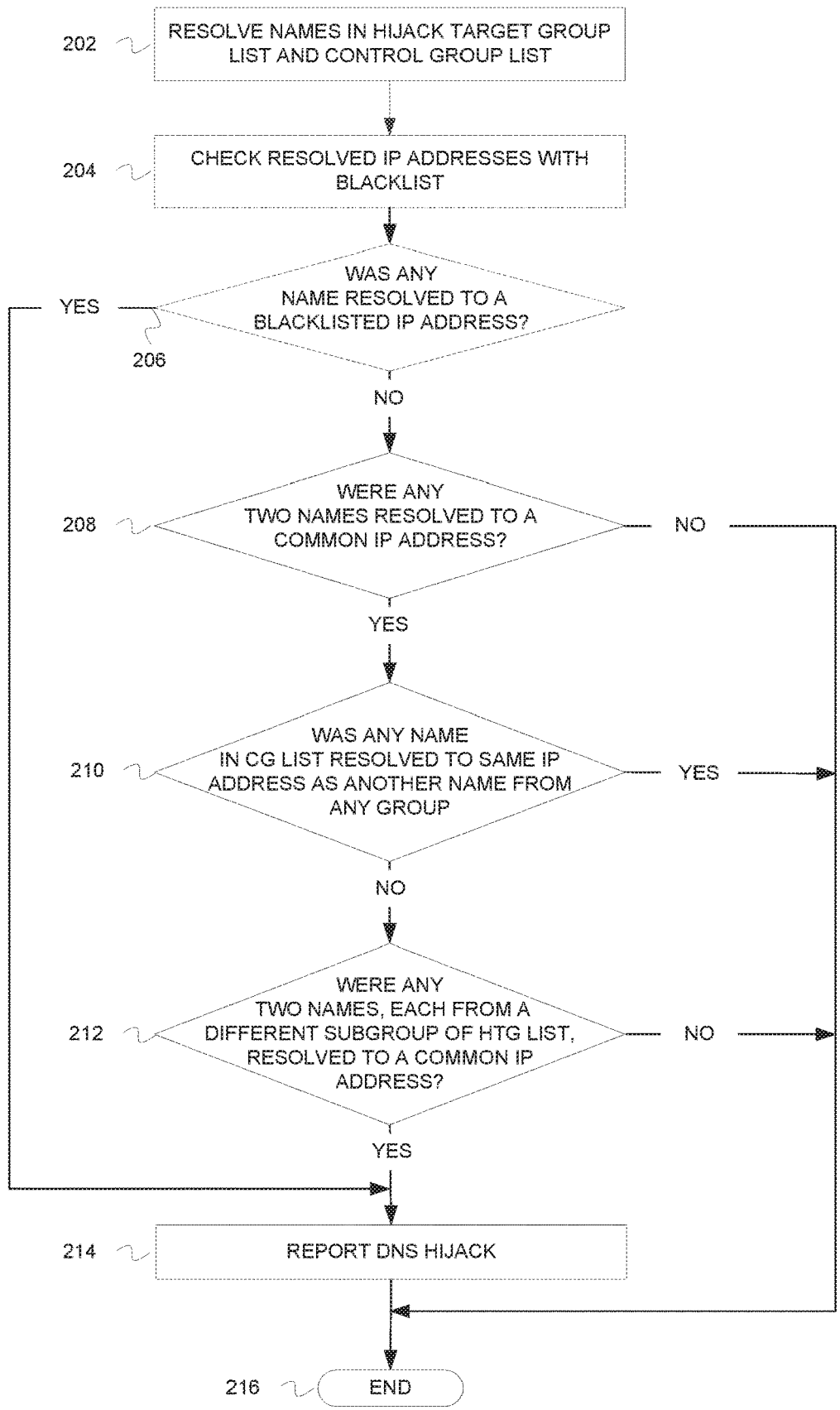
FIG. 2 is a flow chart illustrating operations of a method for detecting DNS hijacking in accordance with one embodiment of the present invention.

FIG. 2 is a flow chart illustrating operations of a method for detecting the DNS hijacking in a computer system.

At block 202, the method starts with resolving all domain names from both the hijack targets list 106 and the control group list 108. The answers containing an IP address are stored for each corresponding domain name. In some aspects, the network security scanner 104 sends DNS requests and receives A-type and optionally AAAA-type DNS records in response to the request to access to what is commonly called DNS resolving, or translation of a domain name to Internet Protocol (IP) address.

At block 204, the resolved IP addresses can be optionally checked against a blacklist, such as a malicious IP database, since none of the domains in the hijack targets list 106 and control group list 108 are expected to be hosted on a server declared as malicious. If the check against a blacklist is performed, the results are reviewed at block 206. If any resolved IP address is on the blacklist, then the method proceeds to block 214, where a DNS hijack is reported. This step is not mandatory for the method, but in some aspects, this operation can improve performance against very low profile hijacks.

In some aspects, the remaining operations at block 208-212 are executed with respect to those DNS query responses that contain a maximum number of NIP addresses per protocol. N can be as low as 1, which works well for current DNS hijack attempts where rogue resolvers typically only give 1 reply for hijacked domains, and N can be separate for IPv4 and IPv6 protocols. In other words, a DNS query that has a response with a large number is more likely to be "clean", i.e., not from an attacker. The high count responses are still included in searches for pairings, however, the search doesn't originate from a high count response when this optional filter is applied. This optional filtering is desirable, because it can reduce the number of false positives.

At block 208, a check is made to determine if any two of the domains in the hijack targets list 106 were resolved to a common IP address. If no two domains resolve to a common IP address, then the method proceeds to block 216 where the method ends, there being no evidence of the DNS hijacking at the time the method is performed. If two domains resolve to a common IP address, then the method proceeds to block 210.

Blocks 210 and 212 assist in reducing false positives by determining if a legitimate reason exists for two domain names to resolve to a common IP address. If a legitimate reason exists, then an indication of the DNS hijacking is not provided. If a legitimate reason does not exist, then an indication of DNS hijacking can be provided. While block 210 and 212 are desirable, they are not required and are not performed in some embodiments.

At block 210, a check is made to determine if a name in the control group list 108 resolves to the same IP address as any other domain in either the hijack targets list 106 or the control group list 108. It is desirable to confirm a suspicion of DNS hijacking before being reported. This is because it is desirable to distinguish a malicious hijack from cases of legitimate DNS record manipulation, which may be done typically, but not exclusively, by the Internet service provider (ISP) and/or by local network infrastructure, for example a captive portal or a content filter. The key distinguishing factor is that legitimate DNS manipulation almost universally affects a wide range of domains, and as such is, if present, extremely probable to affect at least one of the very highly prevalent domains in the control group list 108. The possibility of a legitimate filter affecting only domains in the hijack target group (HTG) list is deemed to be virtually zero for the purpose of this algorithm. Therefore, if any domain from the control group list 108 is resolved to the same IP address as any other domain from either the control group list 108 or the hijack targets list 106, the entire situation is considered to be either legitimate manipulation or a combination of legitimate and malicious hijacks. In this case, the method proceeds to block 216 where it ends. Otherwise it continues to block 212.

At block 212, a check is made to determine if the domains resolving to a common IP address belong to the same subgroup (i.e., are owned by the same entity). This is a legitimate situation, and if it occurs, DNS hijacking is not detected. If all of the domains that resolve to a common IP address are in the same subgroup or subgroups, then the method proceeds to block 216 where the method ends. If the domains resolving to a common IP address do not belong the same subgroup (i.e., are owned by different entities), then the method proceed to block 214.

At block 214, the DNS hijacking is reported. The DNS hijacking indication can be reported to a user, or it can be reported to an application that can, with the user's permission, reset the DNS server values to addresses of legitimate DNS services.

Figure 3:
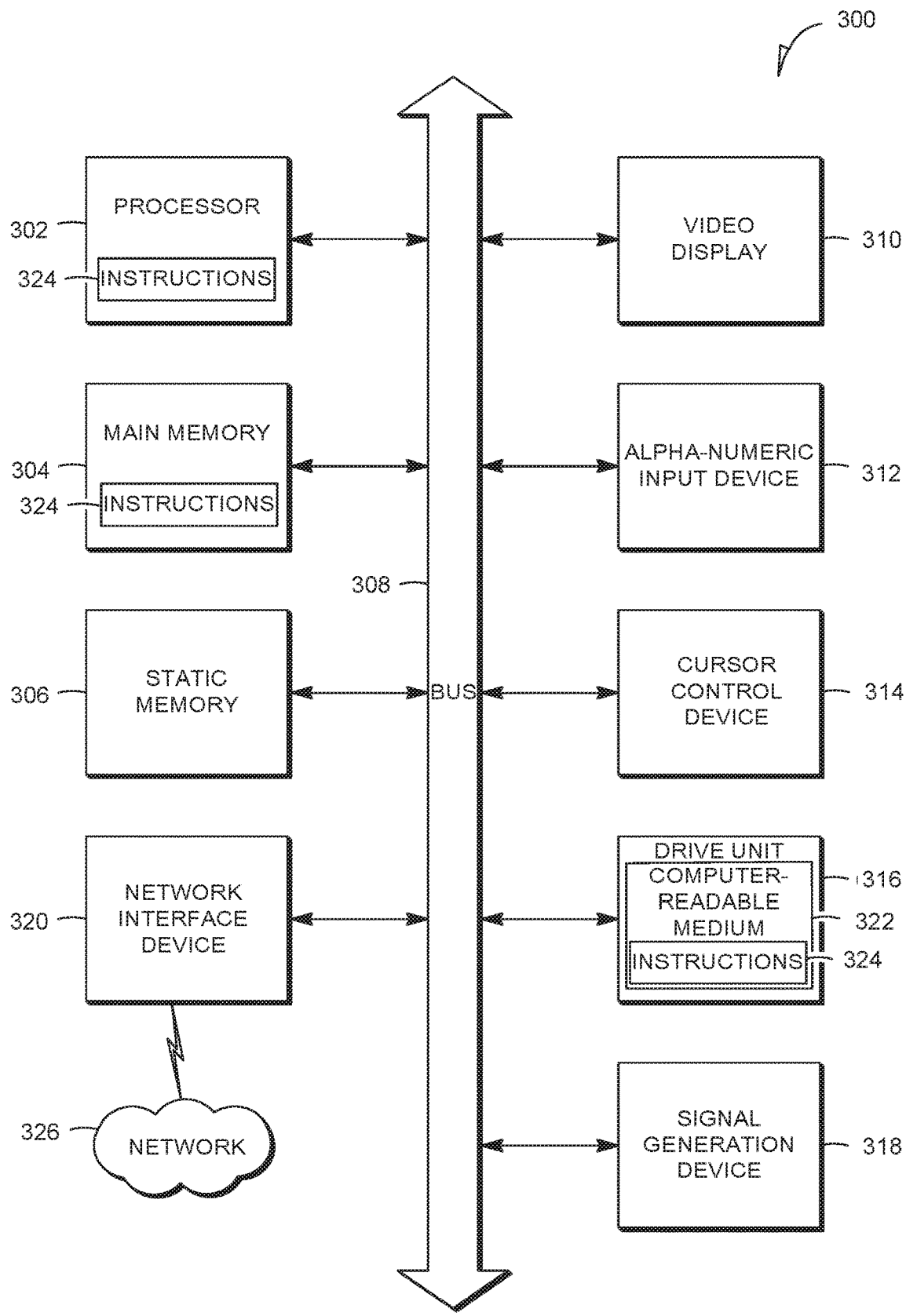
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the aspects of the present invention may be practiced with other computer system configurations, including hand-held devices, multiprocessor systems, microprocessor-based or programmable consumer electronics, smart phones, network PCs, minicomputers, mainframe computers, and the like. Aspects of the present invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information, and other suitable computer-readable storage media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the team "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

In the claims below, certain elements may be labeled with a lower letter. Such labeling is merely for convenience in referring to the elements in dependent claims. No ordering of elements is intended or required by such labeling.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for detecting a Domain Name Service (DNS) hijacking, the computer-implemented method comprising the steps of:
resolving domain names in a hijack target group list to Internet Protocol (IP) addresses;

resolving domain names in a control group list to IP addresses, wherein the domain names in the control group list are prevalent domain names;

determining, based on the resolving of domain names in the hijack target group list, whether two domain names in the hijack target group list resolved to a common IP address;

in response to determining that two domain names in the hijack target group list resolved to the common IP address, determining, based on the resolving of the domain names in the control group list, whether any domain name in the control group list resolved to the same IP address as any other domain name in either the hijack target group list or the control group list; and in response to determining that no domain names in the control group list resolved to the same IP address as any other domain name in either the hijack target group list or the control group list, indicating a DNS hijacking has occurred.

2. The computer-implemented method of claim 1, further comprising, in response to determining the two domain names in the hijack target group list resolved to the common IP address, determining if the two domain names resolving to the common IP address belong to a same subgroup.

3. The computer-implemented method of claim 1, wherein the step of resolving the domain names in the hijack target group list further comprises:

sending a DNS request from a network security scanner coupled to a user computing device, wherein the DNS request includes DNS server setting values of the user computing device; and in response to the DNS request, receiving records information.

4. The computer-implemented method of claim 3, further comprising:

reporting the occurrence of the DNS hijacking to an application; and resetting, by the application, the DNS server setting values of the user computing device.

5. The computer-implemented method of claim 1, wherein the prevalent domain names in the control group list are domain names of at least one of non-profit internet services, universities, open-source projects, and consumer product vendors.

6. The computer-implemented method of claim 1, further comprising reporting the occurrence of the DNS hijacking to a user.

7. The computer-implemented method of claim 1, further comprising reporting the occurrence of the DNS hijacking to an application.

8. A computer-implemented method for detecting a malicious Domain Name Service (DNS) hijacking, the computer-implemented method comprising the steps of:

allowing a computing device to issue queries for Internet Protocol (IP) addresses associated with domain names, the computing device being coupled with a network security scanner having a first domain name group list and a second domain name group list, wherein domain names in the second domain name group list are prevalent domain names;

resolving the domain names in the first domain name group list;

resolving the domain names in the second domain name group list;

determining, based on the resolving of domain names in the first domain name group list, whether two domain names in the first domain name group list resolved to a common IP address;

in response to determining that two domain names in the first domain name group list resolved to the common IP address, determining whether any domain name in the second domain name group list resolved to the same IP address as any other domain name in either the first domain name group list or the second domain name group list, including determining if the two domain names resolved to the common IP address belong to a same subgroup; and in response to determining that no domain names in the second domain name group list resolved to the same IP address as any other domain name in either the first domain name group list or the second domain name group list, indicating a DNS hijacking has occurred.

9. The computer-implemented method of claim 8, further comprising the steps of:

checking the resolved domain names against a blacklist.

10. The computer-implemented method of claim 8, wherein the prevalent domain names in the second domain name group list are domain names of at least one of non-profit internet services, universities, open-source projects, and consumer product vendors.

11. The computer-implemented method of claim 8, further comprising reporting the occurrence of the DNS hijacking to a user.

12. The computer-implemented method of claim 8, further comprising reporting the occurrence of the DNS hijacking to an application.

13. The computer-implemented method of claim 8, further comprising:

sending a DNS request from the network security scanner, wherein the DNS request includes DNS server setting values of the computing device;

reporting the occurrence of the DNS hijacking to an application; and resetting, by the application, the DNS server setting values of the computing device.

14. A non-transitory computer readable storage medium having a program stored thereon, the program causing the computer to execute the steps of:

resolving domain names in a first domain name group list to Internet Protocol (IP) addresses;

resolving domain names in a control group list to IP addresses, wherein the domain names in the control group list are prevalent domain names;

determining, based on the resolving of domain names in the first domain name group list, whether two domain names in the first domain name group list resolved to a common IP address;

in response to determining that two domain names in the first domain name group list resolved to the common IP address, determining, based on the resolving of the domain names in the control group list, whether any domain name in the control group list resolved to the same IP address as any other domain name in either the first domain name group list or the control group list; and in response to determining that no domain names in the control group list resolved to the same IP address as any other domain name in either the first domain name group list or the control group list, indicating a Domain Name Service (DNS) hijacking has occurred.

15. The non-transitory computer readable storage medium of claim 14, the program further causing the computer to, in response to determining the two domain names in the first domain name group list resolved to the common IP address, determining if the two domain names resolving to the common IP address belong to a same subgroup.

16. The non-transitory computer readable storage medium of claim 14, wherein the prevalent domain names in the control group list are domain names of at least one of non-profit internet services, universities, open-source projects, and consumer product vendors.

17. The non-transitory computer readable storage medium of claim 14, the program further causing the computer to report the occurrence of the DNS hijacking to a user.

18. The non-transitory computer readable storage medium of claim 14, the program further causing the computer to report the occurrence of the DNS hijacking to an application.

19. The non-transitory computer readable storage medium of claim 14, the program further causing the computer to:
    send a DNS request from a network security scanner coupled to the computer, wherein the DNS request includes DNS server setting values of the computer;
    report the occurrence of the DNS hijacking to an application; and
    reset, by the application, the DNS server setting values of the computer.

20. The non-transitory computer readable storage medium of claim 14, the program further causing the computer to check the resolved domain names against a blacklist.

\* \* \* \* \*